United States Patent
Fowe et al.

(10) Patent No.: US 11,074,811 B2
(45) Date of Patent: Jul. 27, 2021

(54) METHOD AND APPARATUS FOR USING DRONES FOR ROAD AND TRAFFIC MONITORING

(71) Applicant: HERE GLOBAL B.V., Eindhoven (NL)

(72) Inventors: James Fowe, Chicago, IL (US); Filippo Pellolio, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/107,651

(22) Filed: Aug. 21, 2018

(65) Prior Publication Data
US 2020/0066142 A1 Feb. 27, 2020

(51) Int. Cl.
*G08G 1/01* (2006.01)
*B64C 39/02* (2006.01)

(52) U.S. Cl.
CPC ........... *G08G 1/012* (2013.01); *B64C 39/024* (2013.01); *B64C 2201/127* (2013.01); *B64C 2201/141* (2013.01)

(58) Field of Classification Search
CPC .............................. G08G 1/012; B64C 39/024; B64C 2201/127; B64C 2201/141
See application file for complete search history.

(56) References Cited

U.S. PATENT DOCUMENTS

| | | | |
|---|---|---|---|
| 9,457,915 B2 | 10/2016 | Wang | |
| 9,527,605 B1 | 12/2016 | Gentry et al. | |
| 9,773,419 B1 * | 9/2017 | Gordon | G08G 5/0069 |
| 9,952,594 B1 * | 4/2018 | Zhao | G05D 1/0094 |
| 2014/0267703 A1 * | 9/2014 | Taylor | G06T 7/73 |
| | | | 348/139 |
| 2016/0012589 A1 | 1/2016 | Hamer et al. | |
| 2016/0078759 A1 | 3/2016 | Nerayoff et al. | |
| 2016/0127641 A1 | 5/2016 | Gove | |

(Continued)

OTHER PUBLICATIONS

Menouar et al., "UAV-enabled Intelligent Transportation Systems for the Smart City: Applications and Challenges," Published in: IEEE Communications Magazine ( vol. 55, Issue: 3, Mar. 2017), pp. 22-28.

(Continued)

*Primary Examiner* — Brian A Zimmerman
*Assistant Examiner* — Kevin Lau
(74) *Attorney, Agent, or Firm* — Ditthavong, Steiner & Mlotkowski

(57) ABSTRACT

An approach is provided for using aerial drones for road and traffic monitoring. The approach, for example, involves navigating an aerial drone to a physical marker located on a road link. The approach also involves initiating a capture of sensor data of the physical marker by a sensor of the aerial drone. The approach further involves adjusting a position, an altitude, or a combination thereof of the aerial drone to a reference position, a reference altitude, or a combination thereof over the physical marker based on the sensor data. The approach further involves initiating a capture of one or more images of the road link by the aerial drone at the reference position, the reference altitude, or a combination thereof. By way of example, the captured images can be processed for road and traffic monitoring and/or other similar applications.

20 Claims, 16 Drawing Sheets

(56) References Cited

U.S. PATENT DOCUMENTS

| | | | |
|---|---|---|---|
| 2016/0171278 A1* | 6/2016 | Ponder | G06K 9/00651 |
| | | | 382/104 |
| 2017/0217589 A1* | 8/2017 | Maekawa | B64C 39/024 |
| 2017/0323129 A1* | 11/2017 | Davidson | G06K 7/10871 |
| 2018/0156616 A1* | 6/2018 | Bennett | B64C 39/024 |
| 2018/0188738 A1* | 7/2018 | Tatourian | G05D 1/0246 |

OTHER PUBLICATIONS

Chao, "Vision-based Autonomous Control and Navigation of a UAV," Undergraduate Research Opportunity Program (UROP) Project Report, Nov. 2014, 40 pages.

Salvo et al., "Urban Traffic Analysis Through an UAV," EWGT2013—16th Meeting of the EURO Working Group on Transportation, Procedia—Social and Behavioral Sciences 111, Feb. 5, 2014, pp. 1083-1091.

Admin, "Project's Outcomes Presented at VTC Spring 2017," retrieved from http://droneits.com/projects-outcomes-presented-vtc-spring-2017/, Jun. 3, 2017, pp. 1-4.

Office Action for corresponding European Patent Application No. 19192456.2-1207, dated Feb. 12, 2020, 9 pages.

* cited by examiner

METHOD AND APPARATUS FOR USING DRONES FOR ROAD AND TRAFFIC MONITORING

BACKGROUND

The popularity of navigation and mapping services among consumers has led to a growing demand for real-time road and traffic monitoring for data on traffic speed, traffic volume, traffic events (e.g., accidents, construction, etc.). Because traditional real-time data collection methods (e.g., in-road sensors, crowd sourced reports, etc.) can be expensive or have limited coverage, mapping data service providers and device manufacturers are continually development new road and traffic data monitoring techniques. For example, in light of the growing use of unmanned aerial vehicles (UAVs) or aerial drones in various other applications, service providers face significant technical challenges to adapting aerial drones for road and traffic monitoring.

SOME EXAMPLE EMBODIMENTS

Therefore, there is a need for an approach for using drones for road and traffic monitoring.

According to one embodiment, a method comprises navigating an aerial drone to a physical marker located on a road link. The method also comprises initiating a capture of sensor data of the physical marker by a sensor of the aerial drone. The method further comprises adjusting a position, an altitude, or a combination thereof of the aerial drone to a reference position, a reference altitude, or a combination thereof over the physical marker based on the sensor data. The method further involves initiating a capture of one or more images of the road link by the aerial drone at the reference position, the reference altitude, or a combination thereof. In one embodiment, the one or more images can be processed for road and traffic monitoring.

According to another embodiment, a system comprises a swarm of aerial drones, a plurality of docking stations configured to dock the swarm of drones, and at least one physical marker located on at least one road link. At least one aerial drone of the swarm of aerial drones is configured to navigate to the at least one physical marker. The at least one aerial drone is also configured to initiate a capture of sensor data of the at least one physical marker by a sensor of the at least one aerial drone. The at least one aerial drone is further configured to adjust a position, an altitude, or a combination thereof of the at least one aerial drone to a reference position, a reference altitude, or a combination thereof over the at least one physical marker based on the sensor data. The at least one aerial drone is further configured to initiate a capture of one or more images of the road link by the aerial drone at the reference position, the reference altitude, or a combination thereof. In one embodiment, the one or more images can be processed for road and traffic monitoring.

According to another embodiment, an apparatus comprises at least one processor, and at least one memory including computer program code for one or more computer programs, the at least one memory and the computer program code configured to, with the at least one processor, cause, at least in part, the apparatus to navigate an aerial drone to a physical marker located on a road link. The apparatus also is caused to initiate a capture of sensor data of the physical marker by a sensor of the aerial drone. The apparatus is further caused to adjust a position, an altitude, or a combination thereof of the aerial drone to a reference position, a reference altitude, or a combination thereof over the physical marker based on the sensor data. The apparatus is further caused to initiate a capture of one or more images of the road link by the aerial drone at the reference position, the reference altitude, or a combination thereof. In one embodiment, the one or more images can be processed for road and traffic monitoring.

According to another embodiment, a computer-readable storage medium carries one or more sequences of one or more instructions which, when executed by one or more processors, cause, at least in part, an apparatus to navigate an aerial drone to a physical marker located on a road link. The apparatus also is caused to initiate a capture of sensor data of the physical marker by a sensor of the aerial drone. The apparatus is further caused to adjust a position, an altitude, or a combination thereof of the aerial drone to a reference position, a reference altitude, or a combination thereof over the physical marker based on the sensor data. The apparatus is further caused to initiate a capture of one or more images of the road link by the aerial drone at the reference position, the reference altitude, or a combination thereof. In one embodiment, the one or more images can be processed for road and traffic monitoring.

According to another embodiment, an apparatus comprises means for navigating an aerial drone to a physical marker located on a road link. The apparatus also comprises means for initiating a capture of sensor data of the physical marker by a sensor of the aerial drone. The apparatus further comprises means for adjusting a position, an altitude, or a combination thereof of the aerial drone to a reference position, a reference altitude, or a combination thereof over the physical marker based on the sensor data. The apparatus further comprises means for initiating a capture of one or more images of the road link by the aerial drone at the reference position, the reference altitude, or a combination thereof. In one embodiment, the one or more images can be processed for road and traffic monitoring.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for using aerial drones for road and traffic monitoring are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
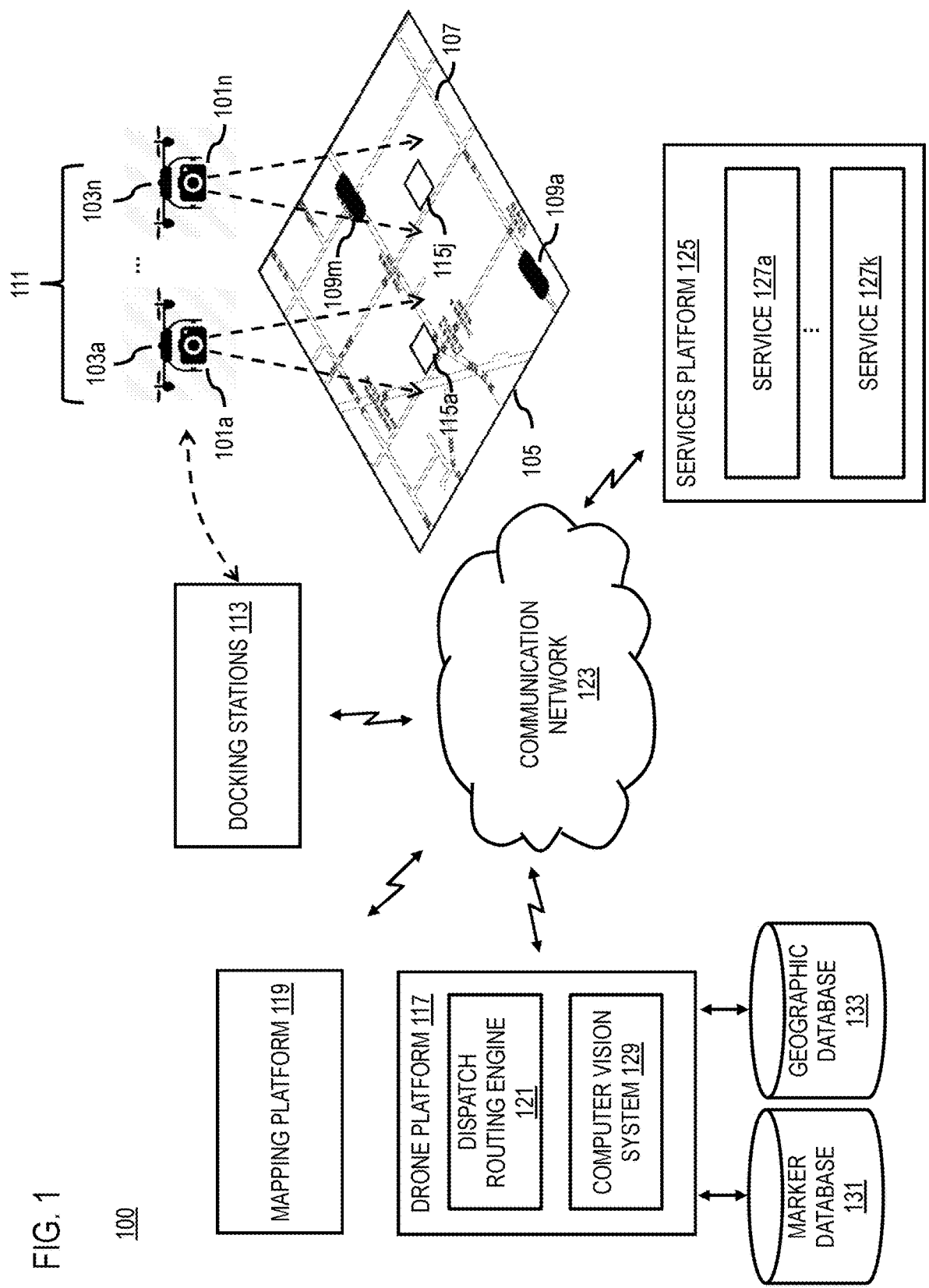
FIG. 1 is a diagram of a system capable of using drones for road and traffic monitoring, according to one embodiment.

FIG. 1 is a diagram of a system capable of using drones for road and traffic monitoring, according to one embodiment. The need for road and traffic monitoring remains an important factor for city planning and advancement as well as providing navigation, mapping, and/or other location-based services to end users. For example, monitoring traffic speed and volume can be used to create a complete model of traffic flow in a city. However, not all sensors can be used to obtain this information at scale. For example, inductive loop sensors and other similar in-road sensors are able to obtain both traffic speed and volume information, but they are very expensive infrastructure to embed on all roads, and so cannot scale across a large road network. Mounted traffic cameras can be good at measuring traffic volume, but may not be so accurate in speed measurement. GPS probes are currently the most ubiquitous traffic sensors, but probe data can also have limitations because GPS probes are able to report only traffic speeds for each individual probe. Additionally, it can be difficult to obtain accurate traffic volume information because not all vehicles traveling on a road link report probe data, and the penetration rate or GPS probes versus all traffic vehicles is generally not known with accuracy.

In addition, the sensors such as those described above (excluding GPS probes) are static (e.g., mounted cameras and inductive loop sensors) and non-dynamic infrastructure in that they are installed at fixed location. This static installation of these sensors can make it very expensive to install them over a wide area of a road network, and therefore it is unrealistic to have them on every road because of generally constrained budgets and resources.

To address these problems, a system 100 of FIG. 1 introduces a capability to use a new type of sensor (e.g., sensors 101a-101n, such as cameras, mounted on aerial drones 103a-103n, also collectively referred to as drones 103) for traffic monitoring that is cheaper than inductive loop sensors and traffic cameras, and yet able to obtain both traffic volume and speed information. In other words, the system 100 uses drone-mounted cameras, e.g., sensors 101a-101n (also collectively referred to as sensors 101) to dynamically and periodically capture/monitor traffic of many roads in a geographic area 105 (e.g., a city) including a road network 107 traversed by vehicles 109a-109m (also collectively referred to as vehicles 109).

The embodiments of drone-camera sensing approach described herein solves the problems described above because the drones 103 and the sensors 101 mounted on them are dynamic (in location) as they are able to move from monitoring one road to another road and then to yet another road of the road network 107. In this way, the embodiments of the system 100 described herein can advantageously use a single hardware infrastructure (e.g., drones 103, sensors 101, etc.) to monitor multiple roads in the geographic area 105. This approach, for instance, is cheaper than installing fixed cameras on roads because a single drone 103 can take pictures for many roads. The drone 103 could also provide higher quality images since buying significantly fewer cameras means being able to spend more money per camera.

In one embodiment, because of the mobility of the drones 103, the system 100 can optimize the choice or roads to monitor by automatically directing a swarm 111 of drones 103 (e.g., launched from docking stations 113 located throughout or near the geographic area 105) to roads where there is no other sensor coverage (e.g., little or no probe coverage), thereby presenting an opportunity for sensor fusion of drone-camera information and other available traffic sensors in order to have a complete coverage of traffic monitoring in the geographic area 105 (e.g., a city or any other designated area).

In one embodiment, the embodiments of the drone-based monitoring described herein are based image analysis of the image data captured of the road network 107 by the drones 103. The accuracy of the monitoring data (e.g., traffic speed, traffic volume, road events, etc.) obtained from the image analysis can be highly dependent on the having a consistent direct vertical alignment over a monitored road segment. Achieving this consistent vertical alignment and/or consistent vertical height or perspective from which to capture road images presents a significant technical challenge. To address this challenge, the system 100 can use physical markers 115a-115j (also collectively referred to as markers 115) to designate specific road segments that are to be monitored. The markers 115 are placed on the corresponding road segments so that they are visible or detectable by the drones 103 using their sensors 101 (e.g., cameras or other sensors such as radar, LiDAR, etc.) when the drones 103 fly overhead.

In one embodiment, in addition to designating the exact road segments to monitor, the markers 115 can have a known or fixed size so that they can be used by the drones 103 or a drone platform 117 controlling the drones 103 can use the markers 115 to more precisely align their positions or altitudes over the marker 115 to achieve an optimal vertical alignment. As noted above, a consistent vertical alignment enables more precise estimation of traffic volume and/or speed (e.g., by knowing a precise scale and orientation of the captured image to provide a better estimation of distance, speed, etc.).

Another problem is that most traditional sensors are not able to measure traffic information at lane-level. However, the drone-camera sensors 101 being a direct vertical picture taken above the road segment as described above, the system 100 is able to measure traffic speed and volume at lane-level because of the more precise alignment possible from the marker-based system of the embodiments described herein. This type of detailed understanding of traffic state in near real-time can be used for development the future of transportation and mobility in which there are many dynamic movements on the road like, bikes, self-driving cars and many pedestrian driving assistants that are to be monitored.

Although, the embodiments described herein are mainly discussed with respect to traffic monitoring, it is contemplated that the embodiments are applicable to any application where are precise vertical position or height alignment of a drone 103 over a road segment or other designated area is desired. Other uses of the system 100 can include but are not limited to general road monitoring, city surveillance, image capture of road condition for self-driving cars, etc.

Figure 2:
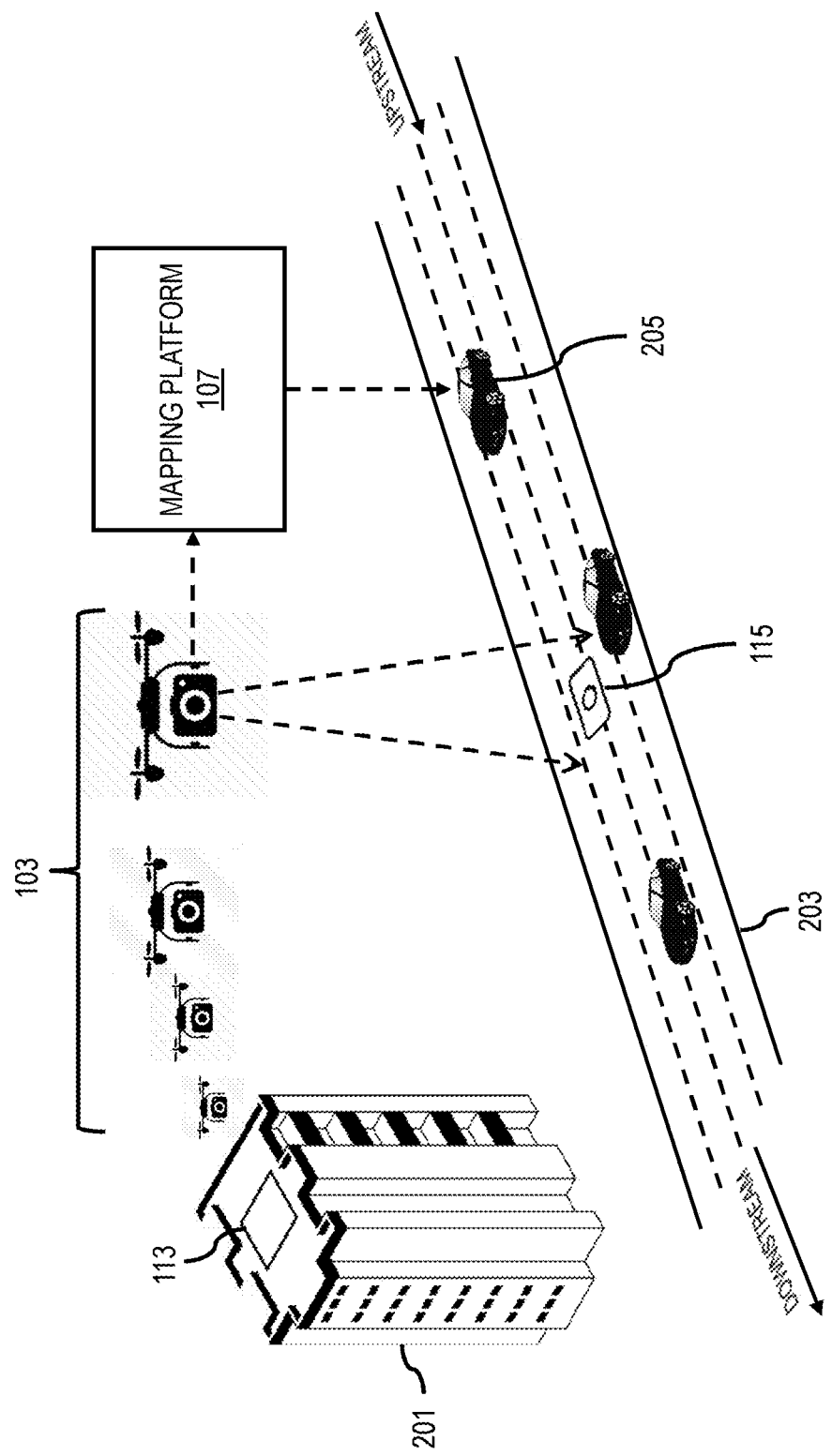
FIG. 2 is a diagram illustrating an example of using a drone for road and traffic monitoring of a road link with a marker, according to one embodiment.

FIG. 2 is a diagram illustrating an example of using a drone for road and traffic monitoring of a road link with a marker, according to one embodiment. In the example of FIG. 2, a drone 103 is launched from its docking station 113 located on top of a building 201. The docking station 113, for instance, provides for recharging, updating (e.g., update maps, routes, etc.), maintenance, etc. of the drone 103 between flights. The drone 103 navigates to a location of a marker 115 on a road segment 203, aligns itself to an optimal or reference position/altitude, and captures an image of the road segment 203. The images can be sent to a mapping platform 119 for processing into road or traffic monitoring information (e.g., traffic volume, speed, dynamic road events, etc.). The mapping platform 119 can then publish the road or traffic monitoring information to a vehicle 205 that is upstream from the monitored location of the road segment 203 to alert the vehicle 205 of upcoming traffic or other detected road events.

Returning to FIG. 1, in one embodiment, the drone platform 117 performs one or more functions related to using drones 103 for road and traffic monitoring. The drone platform 117, for instance, can include a drone dispatch routing engine 121 to centrally control the swarm 111 of drones 113 (e.g., over a communication network 123) to ascertain when and where a drone should be sent (and the air-route to take) in order to obtain data. In addition or alternatively, the drones 103 can be controlled in a distributed via, e.g., equivalent control systems in the drones 103 themselves or in their respective docking stations 113. In one embodiment, the dispatch routing engine 121 can determine road and traffic monitoring needs and the air-route need to meet those needs based on real-time traffic feedback from other traffic service providers (TSPs) (e.g., provided by the services platform 125 and/or any of the services 127a-127k (also collectively referred to as services 127)) or other sensors (e.g., probe data, infrastructure embedded sensors, etc.). For example, the locations of detected real-time events (e.g., accidents, construction, etc.) and/or detected gaps in the data available from TSPs and/or other sensors can be used to determine where to send the drones 103 to capture the real-time events or obtain monitoring data to fill the gaps.

In one embodiment, the dispatch routing engine 121 performs its drone routing functions in conjunction with a computer vision system 129. By way of example, the computer vision system 129 that uses computer vision algorithms to translate image data sent by the drone(s) 103 to give feedback to the dispatch routing engine 121 on image alignment. In this way, the dispatch routing engine 121 can send further drone control commands to a drone 103 until the drone 103 is properly aligned above a marker 115 of interest. Proper alignment, for instance, refers to achieving a designated or reference position and/or altitude over the marker 115 so that the resulting image data is consistent (e.g., with respect to scale, perspective, etc.) to enable more accurate analysis of attributes such as lane-level traffic volume and speed.

In one embodiment, the computer vision system 129 and/or the mapping platform 119 can then process the captured images (e.g., sent from the drones 103 when properly aligned over the markers 115) to generate the traffic speed and volume count information per-link (e.g., entire road segment) and/or per-lane of the road. In one embodiment, the mapping platform 119 can then package and publish the road and traffic monitoring data as real-time data (e.g., over an application programming interface (API)) that can be consume by end users (e.g., TSPs, transportation authorities, autonomous vehicles, law enforcement, etc.).

In one embodiment, the drone platform 117 has access to a marker database 131 and a geographic database 133 to facilitate using drones for road and traffic monitoring. The marker database 131 can store data to identify a marker 115 and related including but not limited to the road segment associated with the marker 115, the location of the marker 115 on the associated road segment, marker image format/settings (e.g., format to be used by the drone 103 when capturing images over the marker 115), landmarks on the associated road segment, etc. The data store in the marker database 131 can be used by the drone platform 117 for drone navigation, image analysis, etc. The geographic database 133 stores a digital map of at least the geographic area 105 of interest to aid in drone navigation and/or providing any other location data used by system 100.

The above presented modules and components of the system 100 can be implemented in hardware, firmware, software, or a combination thereof. In one embodiment, the drone platform 117, dispatch routing engine 121, computer vision system 129, mapping platform 119, and/or other components of the system 100 may be implemented as a cloud-based service, local service, native application, or combination thereof. The functions of these components are discussed in further detail with respect to FIGS. 3-9 below.

Drones 103 are rapidly becoming a very realistic and pragmatic technology. For example, they are being used for deliveries and entertainment. The embodiments of the approach described herein uses them in a novel way for road and traffic monitoring, thereby potentially unlocking a new data analytics insight for smart cities. As described above, in one embodiment of the system 100, multiple docking stations 113 are installed throughout a city or other geographic area 105, where several specialized drones 103 will be docked. In one embodiment, the drones 103 will take pictures of the roads in order to get real-time information (e.g., traffic speed, traffic volume, dynamic events, etc.) about the roads. The drones 103 will fly around the city or designated geographic area 105 so that they can advantageously monitor multiple road segments. In one embodiment, the routing of the drones 103 or the selection of areas to monitor can follow operational research optimization algorithms to maximize the overall value produced by targeting areas with ongoing real-time events or areas where real-time data is not available from traditional sensors or traditional monitoring approaches.

Figure 3:
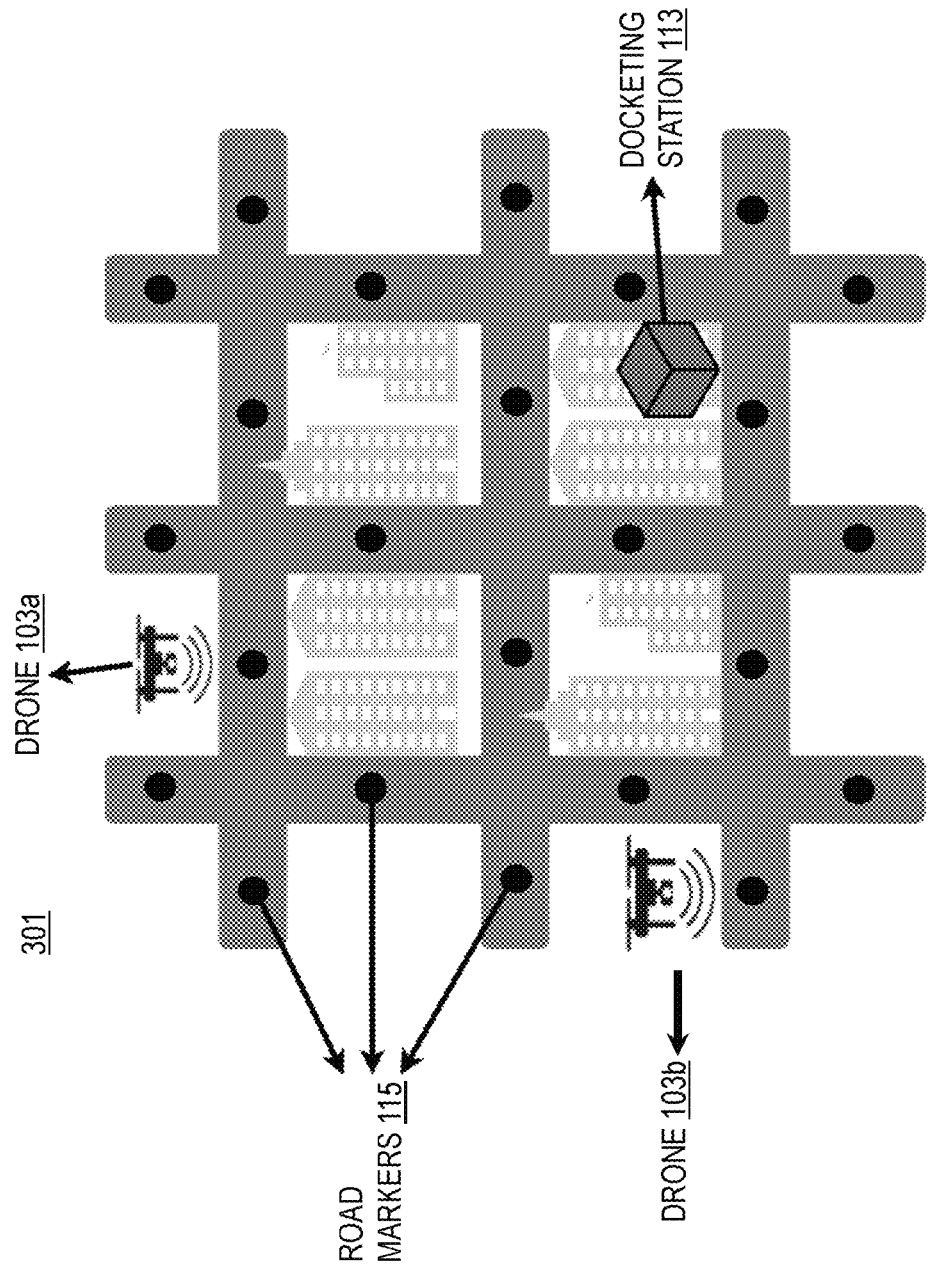
FIG. 3 is a diagram illustrating an example road network that can be monitored by drones, according to one embodiment.

FIG. 3 is a diagram illustrating an example road network 301 that can be monitored by drones, according to one embodiment. In this example, the road network 301 is in an urban area (e.g., a city) in which a docking station 113 has been installed to support drones 103a and 103b for road and traffic monitoring. The docking station 113 can be installed at road level, but because of the drone's flying capability, the docking station 113 can also be suspended or attached outside a high-rise building or other structure.

FIG. 3 also shows the concept of road markers 115. In one embodiment, the road markers 115 help drones to get very precisely positioned pictures for some use cases that depend on high precision (e.g., centimeter-level accuracy). Accordingly, the system 100 can use the markers 115 to precisely align the drones 103 so that such accuracy can be achieved for traffic monitoring data determined from drone image data. In other use cases, a picture of the road in a position "close enough" (e.g., with a threshold distance) to the target marker 115 will work just fine. This could be the case for detecting incidents, potholes, and/or other one-time checks that the system 100 defines as dynamic events. For instance, as long as the pothole is in the picture, the system 100 may not care if the drone is positioned directly over the pothole with centimeters precision.

On the other hand, for some applications, the system 100 may need a perfectly precise picture. An example of this could be traffic speed estimation using computer vision. In order to properly train the machine learning models to estimate traffic speed from image data, the pictures of a certain road should be almost perfectly positioned in the same location. Height from which images are captured is also a very important feature for some applications. For example, in the case of road and traffic monitoring, the system 100 should make sure that the picture taken by a drone 103 spans the entire road width or other feature of interest. Accordingly, when using a fixed camera field of view for image capture, this means positioning the drone 103 and its camera sensor 101 at a certain height.

Since altitude in GPS sensors currently is mostly unreliable, and even location (using probes) is not precise enough for some use cases (especially in cities, where urban canyoning can mean errors of 50 meters or more), the system 100 can solve the technical problem of precisely aligning a drone 103 over a road segment for image capture by using road markers 115 to move a drone 103 to a correct reference position and/or height over a road segment.

Figure 4:
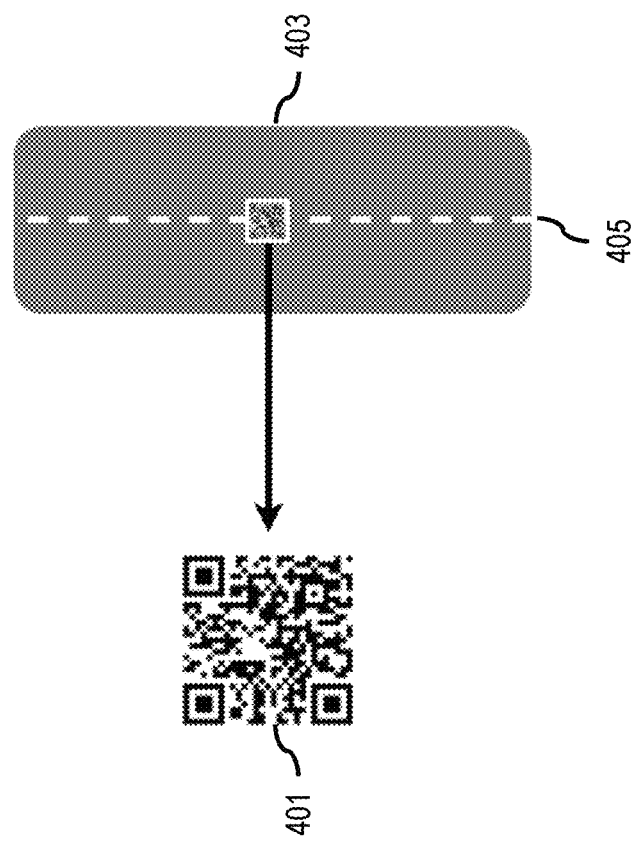
FIG. 4 is a diagram illustrating a marker used for aligning a drone over a road link, according to one embodiment.

As shown in FIG. 4, a road marker 115 is any type of easily recognizable (for a machine) marker, such as a QR code 401, of fixed size that can be used to physically mark a road segment 403 or other environment feature of interest. In one embodiment, these markers 115 can be drawn on a portion of the road segment 403 (e.g., as part of the lane lines 405). The position of the marker 115 on the road segment 403 will allow the drones 103 to position precisely over a marker at a precise height. In one embodiment, the QR code 401 can encode additional information about the road segment 403 (e.g., location, road type, landmarks, incline, etc.), the marker 115 itself (e.g., identifier, location on the road segment 403, etc.), drone configuration parameters (e.g., image type, camera settings, reference height over the marker 115 to take an optimal picture, reference position over the marker 115 to take an optimal picture, etc.). It is noted that a QR code provided by illustration and not as a limitation. Accordingly, the marker can be any other type of physical marker that can be detected by any sensor 101 of the drones 103. For example, if the sensor 101 is a camera sensor, the marker can be a visible marker. If the sensor 101 is LiDAR, radar, etc., the marker 115 can take any form that is detectable by those sensors or otherwise computer recognizable.

Figure 5:
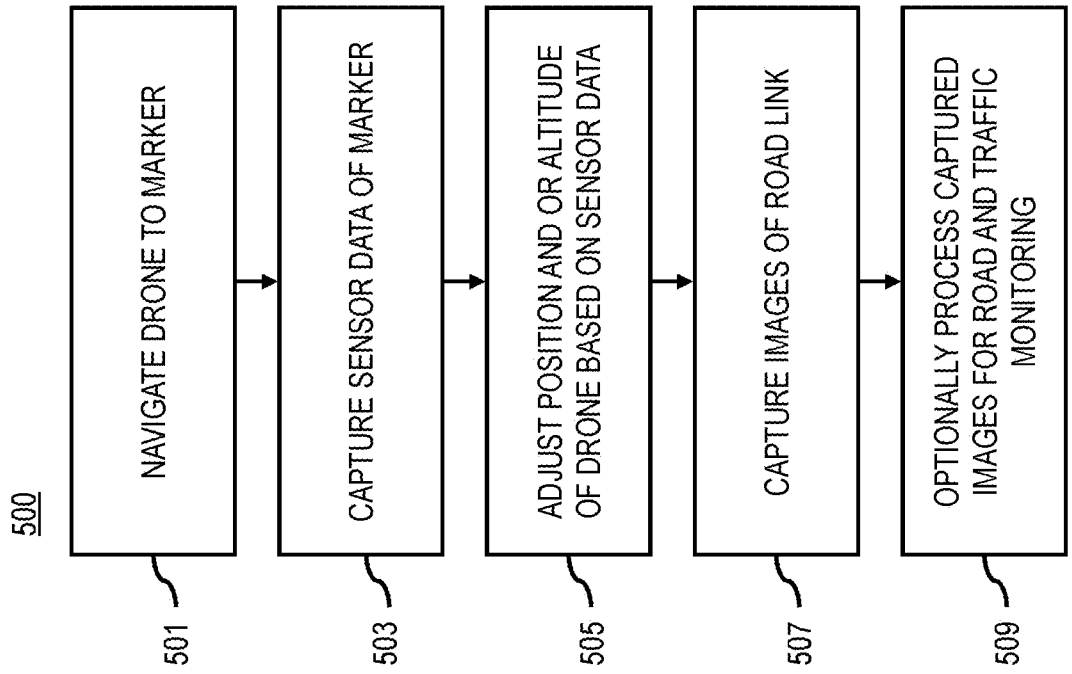
FIG. 5 is a flowchart of a process for using drones for road and traffic monitoring, according to one embodiment.
Figure 12:
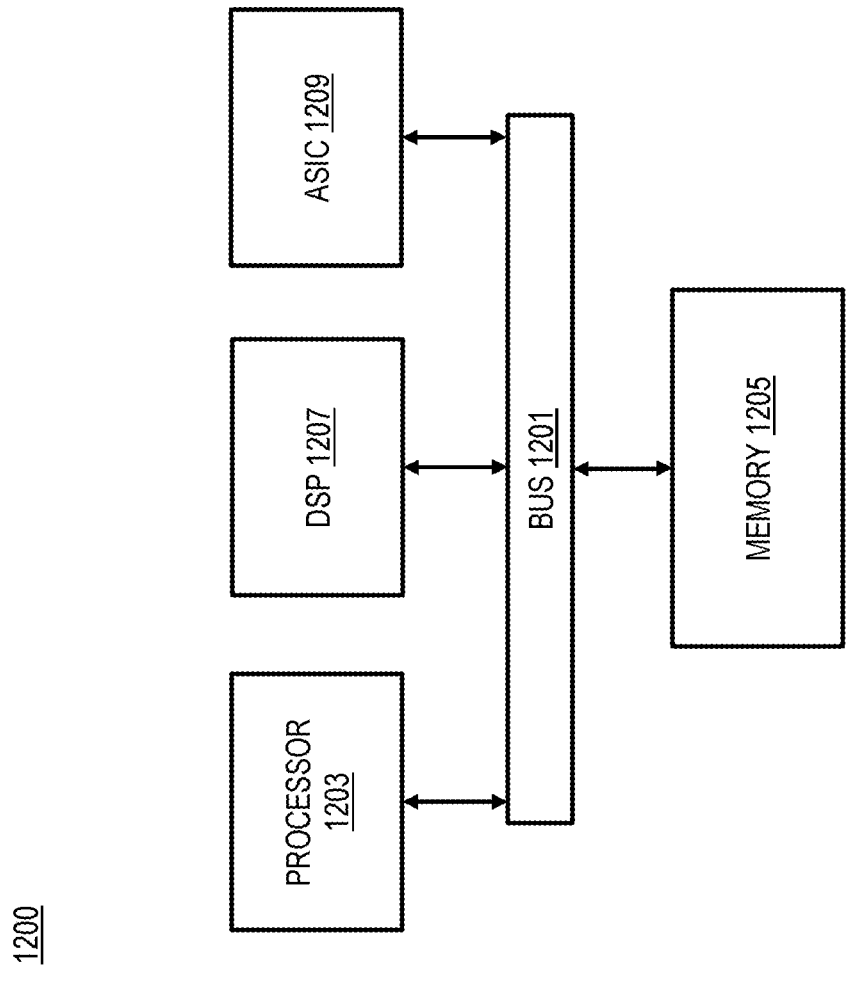
FIG. 12 is a diagram of a chip set that can be used to implement an embodiment.

Because of these markers 115, drones 103 will be able to position properly and precisely at certain points over the road at very low cost to achieve consistent imagery. FIG. 5 is a flowchart of a process for using drones for road and traffic monitoring based on markers, according to one embodiment. In various embodiments, the drone platform 117 and/or any of its components (e.g., the dispatch routing engine 121 and computer vision system 129) may perform one or more portions of the process 500 and may be implemented in, for instance, a chip set including a processor and a memory as shown in FIG. 12. As such, the drone platform 117, the dispatch routing engine 121, and/or the computer vision system 129 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the dispatch routing engine 121 of the drone platform 117 navigates an aerial drone 103 to a physical marker 115 location on a road link or segment. Navigate, for instance, refers to generating an air route for the drone 103 to follow from a current location (e.g., a docking station 113, or any other location such as another marker location) to the target marker 115. In one embodiment, the dispatch routing engine 121 can query the marker database 131 for the location of the target marker 115 where there is a data need (e.g., a location of a detected real-time event that is to be monitored, a location where there is no or out-of-date real-time monitoring data, etc.). Alternatively, the information on the markers 115 can be encoded or stored locally into a system of the drone 103. The dispatch routing engine 121 then calculates a corresponding air route and transmit the route to the drone 103 to execute. In one embodiment, as shown in FIG. 5, the drone 103 executes the route by traveling towards the marker 115 location using, for instance, regular GPS or equivalent navigation to bring the drone 103 within GPS error distance of the target marker 115. As discussed above, because of the imprecision of the GPS or other satellite based location sensors, the drone 103's position and altitude over or near the marker 115 may not be precise enough to support high precision road and traffic monitoring.

Figure 6A:
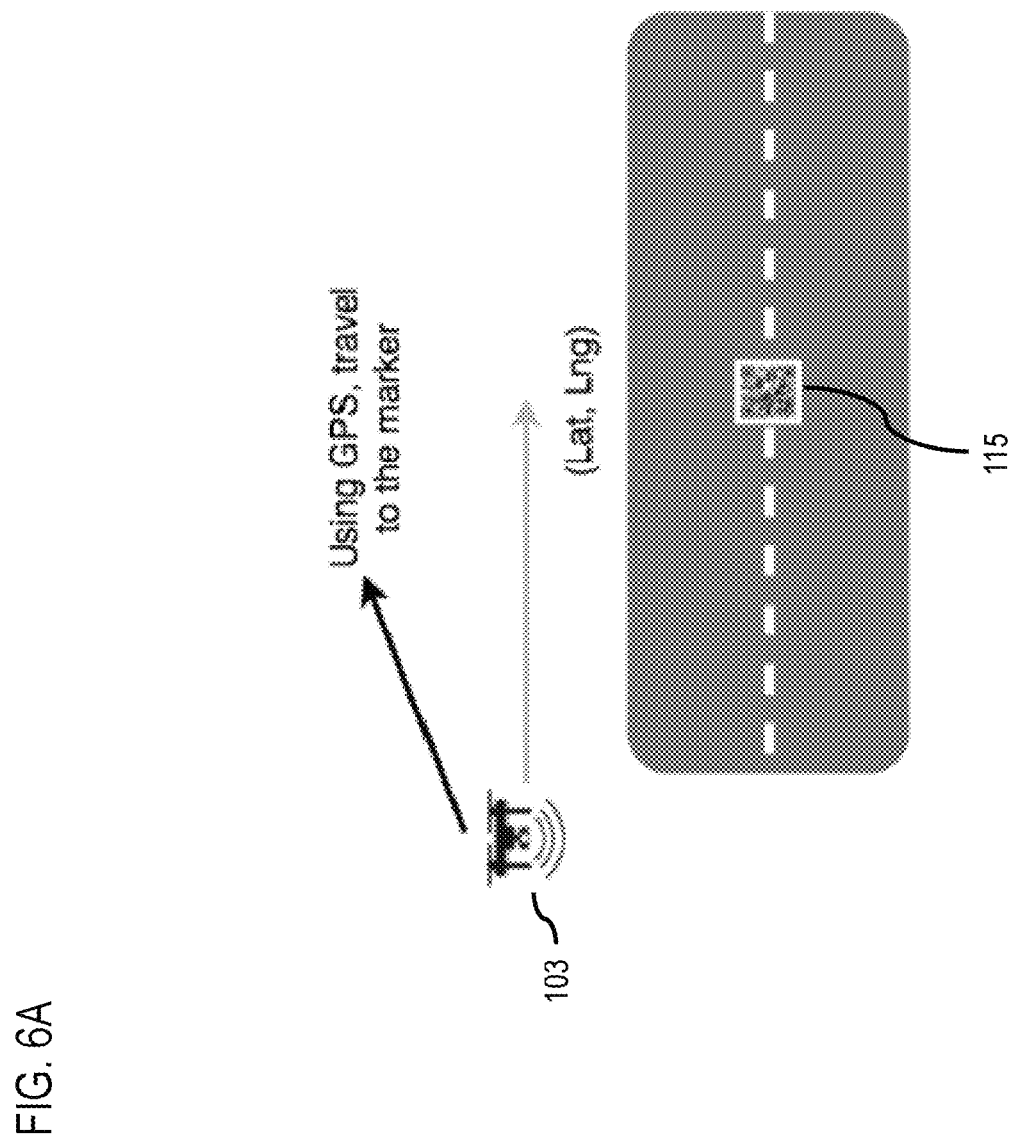
FIGS. 6A-6D are diagrams illustrating aligning a drone using a marker, according to one embodiment.

Accordingly, in step 503, the computer vision system 129 of the drone platform 117 initiates or otherwise instructs the drone 103 to capture sensor data of the physical marker 115 by a sensor 101 of the aerial drone 103 (as shown in FIG. 6A). In one embodiment, the sensor data of the physical marker 115 is an image of the physical marker 115. In other words, the drone 103 uses its camera or other sensor 101 to locate the marker 115 on the road.

In step 505, the drone platform 117 and/or drone 103 can employ a special guidance system to position the drone 103 directly and precisely over the marker 115. For example, the dispatch routing engine 121 in combination with the computer vision system 129 can adjust a position, an altitude, or a combination thereof of the aerial drone to a reference position, a reference altitude, or a combination thereof over the physical marker 115 based on the sensor data. The reference position and reference altitude refer to the position and altitude that has been pre-calibrated by the system 100 to achieve a consistent image (e.g., consistent scale, field of view, perspective, etc.). In one embodiment, the reference position and altitude can vary depending on the characteristics of the drone 103's camera sensor 101. For example, depending on the lens, focal length, resolution, etc., the reference position and altitudes can be customized to achieve a consistent image across different camera or sensor characteristics.

Figure 6B:
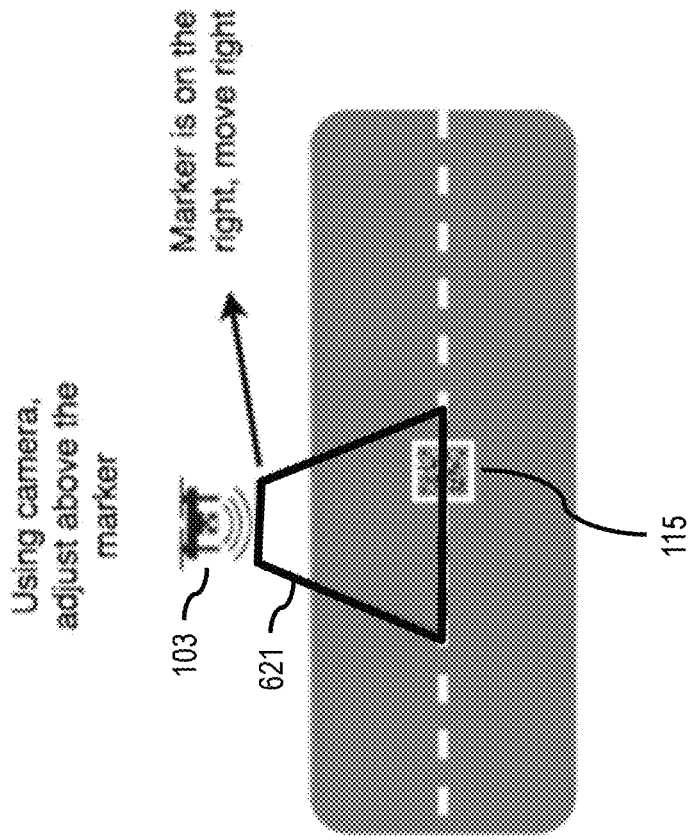

In one embodiment, the special guidance system uses the properties of the marker 115 (e.g., a known fixed size or the marker 115) to make adjustments. For example, knowing the actual size of the marker 115, the size of the marker 115 as it appears in a captured image or other sensor data, and the camera field of view, the drone platform 117 and/or the drone 103 can calculate the current position or altitude to determine what adjustments are needed to move the drone into precise alignment over the marker 115. As shown in FIG. 6B, the drone 103 captures an image with a field of view 621. The computer vision system 129 determines that the marker 115 appears to the right side of the field of view 621. Based on this determination, the dispatch routing engine 121 instructs the drone 103 to move to the right to so that the marker 115 will appear at a target location (e.g., center location) of the field of view 621. In other words, the adjusting of the position of the aerial drone 103 to the reference position over the physical marker comprises moving the aerial drone 103 until the physical marker is positioned at a target location in a field of view 621 of the image of the physical marker 115. In one embodiment, the target location is a center of the field of view 621, but can also be another location or locations within the field of view 621.

Figure 6C:
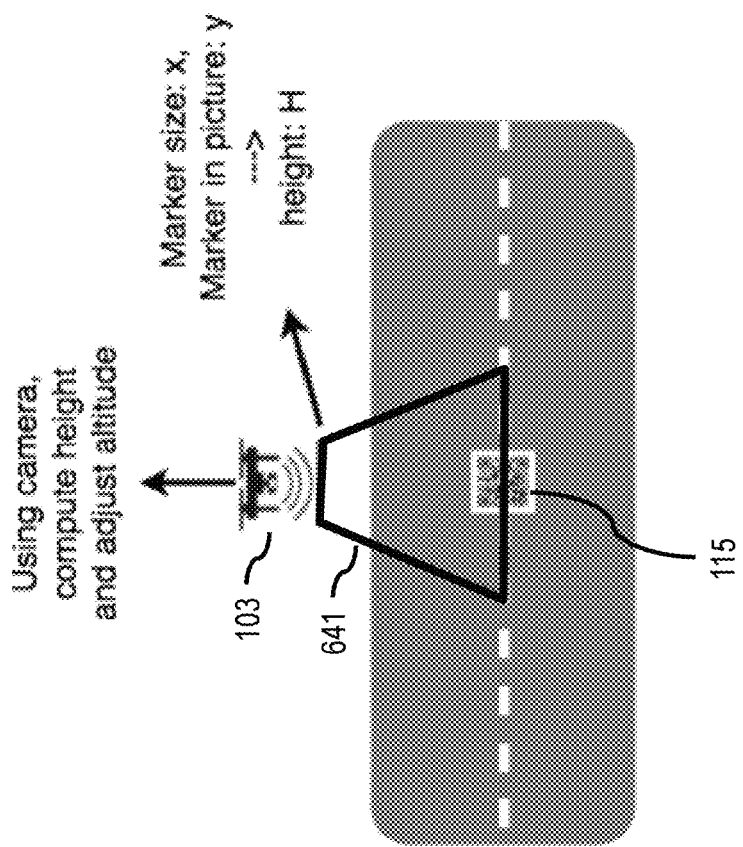

In one embodiment, similar adjustments can be made to the altitude of the drone 103 over the marker 115. As shown in FIG. 6C, the drone 103 captures an image with a field of view 641. The computer vision system 129 determines that size of the marker 115 as it appears in the field of view 641 of the captured image (e.g., a marker size y). The computer vision system 129 can then compare the marker size in the picture (y) to the known actual size of the marker (x) to calculate a current height (H). The dispatch routing engine 121 can then instruct the drone 103 to adjust its current height to the reference or target height. In another embodiment, the dispatch routing engine 121 can adjust the height of the drone 103 until the marker 115 appears at a target size in the field of view 641 of the image. In other words, the drone 103 raises or lowers over the marker 115 until the reference height is reached (e.g., when the marker 115 appears at a target size in the drone-captured image). This target size, for instance, can be precomputed based on the characteristics of the sensors 101 of the drones 103 and the desired consistency of the resulting drone imagery.

Figure 6D:
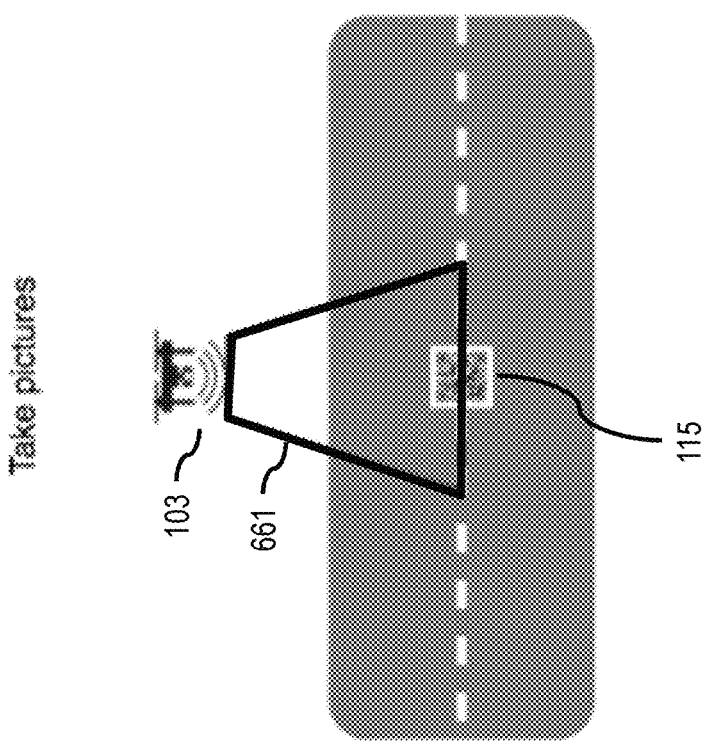

In step 507, the computer vision system 129 initiates a capture of one or more images 661 of the road link by the aerial drone 103 at the reference position, the reference altitude, or a combination thereof, as shown in FIG. 6D. The number of images and frequency of images can vary on the intended use. For example, a single picture can be sufficient to determine traffic volume or road incidents (e.g., accidents, construction, etc.). However, sequential intervals of pictures can be captured to determine traffic speed or other dynamic events.

The embodiments above describe how a drone 103 can position itself properly using a road marker 115. In one embodiment, the drone platform 117 can also determine how drones will be managed in the system 129 (e.g., assigned to different monitoring tasks). It is expected that in most cases, the number of available drones 103 will a finite number, and like fixed cameras will be expensive to deploy on a 1 to 1 drone to road segment basis. As a result, the system 100 will need to manage them optimally to provide the best use of available drone resources.

In one embodiment, the system 100 can configure the drones 103 to travel around a designated geographic area 105 (e.g., a city) taking routine pictures of roads (probably for traffic), and occasionally they will need to travel to a location in order to take pictures of a dynamic event (such as an incident). To balance between routine tasks and incident-driven task, the drone platform 117 can treat the management of the drones 103 as an operations research optimization problem. As a result, the drone platform 117 can assign a value to each objective based on urgency, last picture taken, and/or any other number of attributes. A linear integer problem solver or equivalent process can then optimize the assignments of the drones 103 based on the assigned values.

Figure 7:
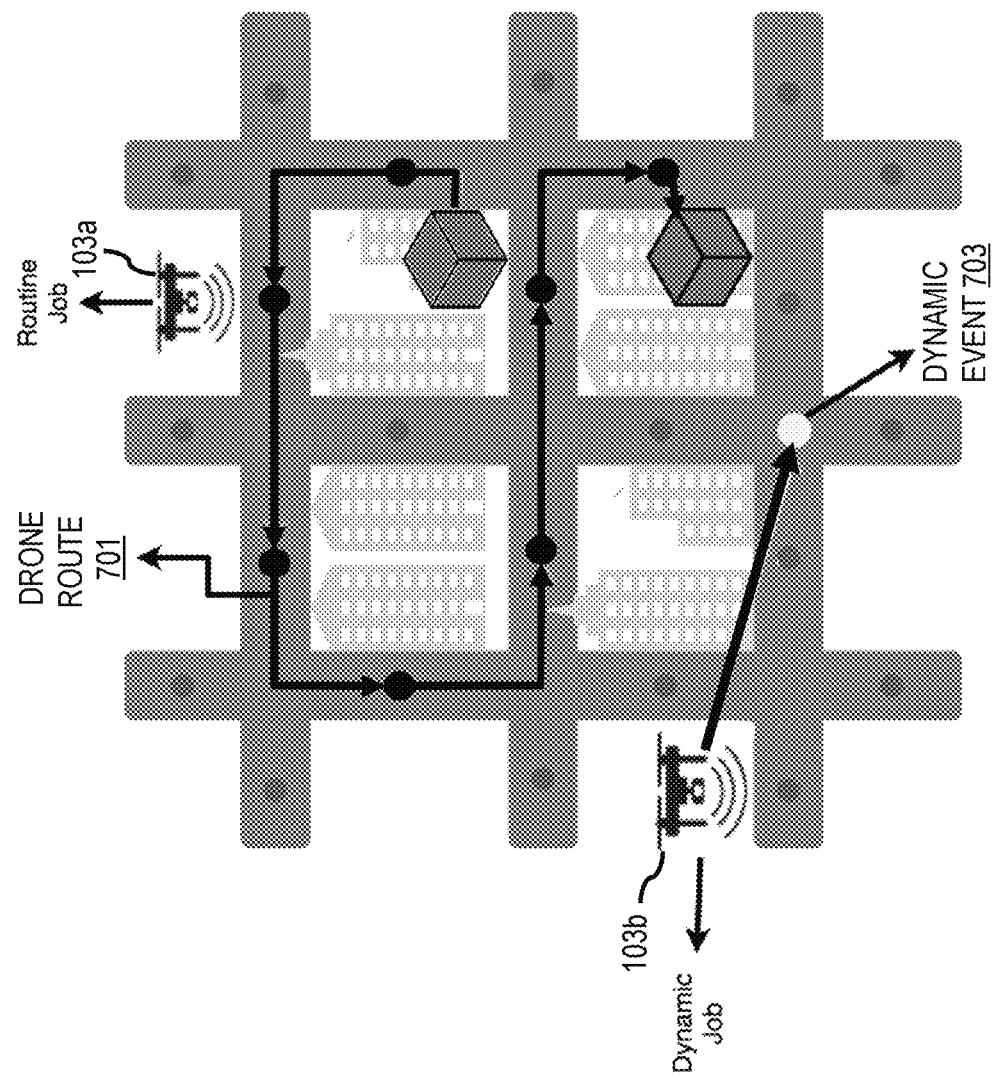
FIG. 7 is a diagram illustrating example routes for drone-based road and traffic monitoring, according to one embodiment.

Once the drone is assigned a set of roads to analyze, a routing algorithm finds the best route (e.g., using a 3D map such as the geographic database 133 containing information about navigable air corridors) to analyze them all. In one embodiment, the drone platform 117 can optimize the drone assignments in real time, so that the drones 103 can react to new events or changed road values. In one embodiment, when a drone battery-charge level goes below a certain threshold or the drone 103 otherwise needs maintenance, the drone 103 will start moving back towards the docking station 113 in order to recharge, receive maintenance, etc. FIG. 7 illustrates two drones 103a and 103b navigating around the city and taking pictures. The drone 103 a is on a routine job traveling from road marker to road marker on a routine route 701, while the drone 103 is reacting to an urgent dynamic event 703 (e.g., incident) and moving towards it as fast as possible.

Returning to step 509 of the process 500, after obtaining image data over the markers 115, the computer vision system 129 and/or mapping platform 119 can optionally process the one or more images of the road link captured at the reference position, the reference altitude, or a combination thereof to determine a traffic volume, a traffic speed, one or more dynamic events, or a combination thereof on the road link. As discussed above, while traffic speed can be estimated using regular vehicle probes, is can be difficult if not impossible to compute traffic volume with them without knowing the penetration rate of the probes. The embodiments described herein overcome this technical problem. This, along with the capacity of estimating the traffic monitoring values at lane level, makes the embodiments described herein useful for TSPs and other end users of traffic information, because traffic volume a key monitoring parameter that is currently technically difficult and/or resource intensive to provide at scale.

In one embodiment, the traffic estimation of the embodiments described herein is based on computer vision. For example, using the road markers 115, the system 100 can provide image data (e.g., pictures) of precisely known location and size (e.g., centime level accuracy) above a road. Once the system 100 has this calibrated image data, the computer vision system 129 can use lane recognition algorithms known in the art, or other object recognition algorithms to determine traffic information for a road segment and/or for each lane of the road segment. In one embodiment, the computer vision system 129 can use, for instance, a machine learning algorithm (e.g., Deep Neural Network, computer vision feature recognition, etc.) to estimate the traffic volume (count of cars) based on a drone captured picture. Road and traffic monitoring parameters (e.g., traffic volume, traffic speed, dynamic events, etc.) can then be determined with respect to a location of the physical marker in the one or more images including with lane-level specificity.

Figure 8:
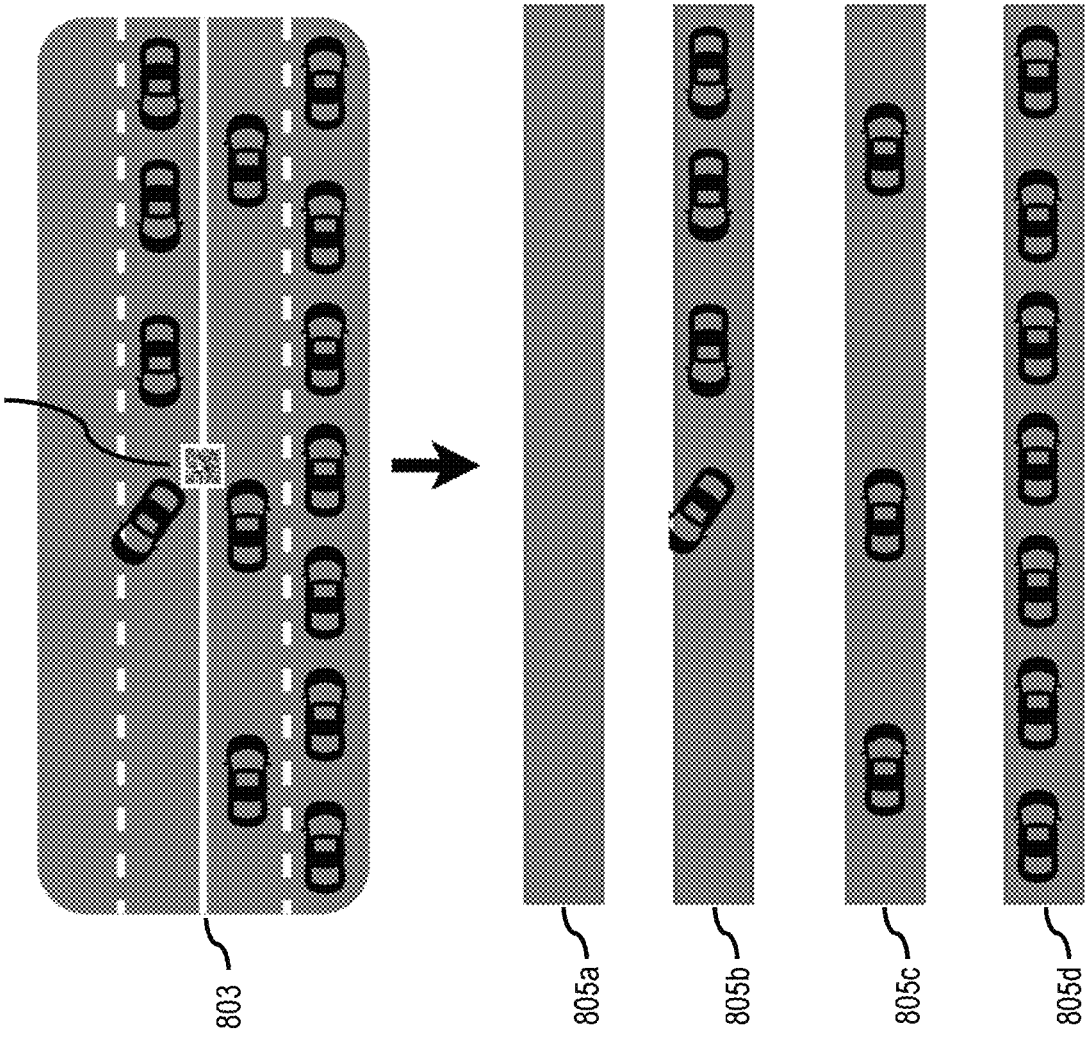
FIG. 8 is a diagram illustrating an example of determining traffic volume using drone-based road and traffic monitoring, according to one embodiment.

For example, FIG. 8 is a diagram illustrating an example of determining traffic volume using drone-based road and traffic monitoring, according to one embodiment. In the example of FIG. 8, an image 801 has captured by a drone 103 that has been precisely aligned to a reference position and altitude over the marker 115. This precise alignment enables the picture 801 to provide a consistent and neutral perspective image a road segment 803 including four lanes of traffic. As a result, the precise alignment of the drone 103 that captured the image 801, the depicted lane lines are straight and distortion free, thereby making it easier for the computer vision system 129 to separate the picture 801 into areas corresponding to each of the four lanes 805a-805d of the road segment shows the process for generating lane-level traffic volume information. The computer vision system 129 can then process each portion of the image 801 corresponding to each lane 803a-803d to estimate the traffic volume. For example, the computer vision system 129 can recognize and count the number of vehicles appearing in each lane (e.g., using machine learning or other object recognition techniques known in the art). The count along with the scale of the image or extent of the depicted road segment 803 can provide a traffic volume estimation. In this example, lane 805a has no traffic volume, lane 805b has medium traffic volume, lane 805c has light traffic volume, and lane 805d has heavy traffic volume.

Figure 9:
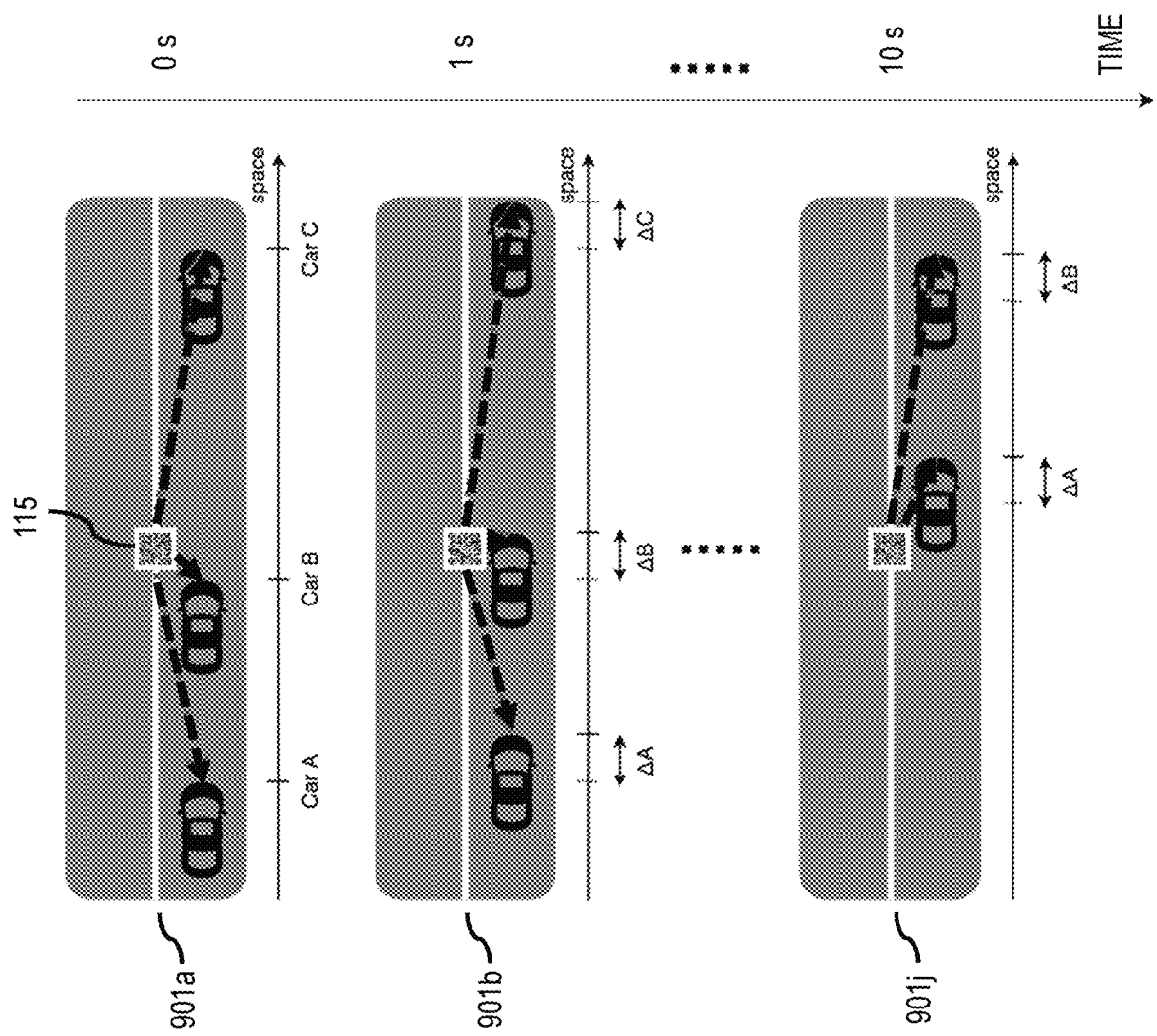
FIG. 9 is a diagram illustrating an example of determining traffic speed using drone-based road and traffic monitoring, according to one embodiment.

In one embodiment, to obtain traffic speed, just a single still image is not enough. Hence, the drone 103 can be configured to take a sequence of images at equal time intervals (e.g., 1 second) or video segment for processing by the computer vision system 129. FIG. 9 is a diagram illustrating an example of determining traffic speed using drone-based road and traffic monitoring, according to one embodiment. In the example of FIG. 9, a drone 103 is precisely aligned over the marker 115 and captures a sequence of images 901a-901j at 1-second intervals. In one embodiment, the computer vision system 129 processes the images 901a-901j to identify each vehicle (e.g., Car A, Car B, and Car C) and its position in each of the images 901a-901j. The changes in the car positions (e.g., between one or more of the images 901a-901j) for each sequence of time between the compared images allows for a measure of the distance covered (e.g., AA for Car A, AB for Car B, and AC for Car C) by each respective car within the time period using the marker 115 as a reference point. In this example, the computer vision system 129 determines the distance from the detected front edge each car to the reference point of the marker 115.

In one embodiment, the computer vision system 129 can use the sequences of images (e.g., 10 images 901a-901j as shown in FIG. 9) to derive speed information and also use each of the images to derive volume count per-lane and then average the volume across the sequence of images (e.g., across 10 images). The determined average speed and volume (e.g., per-link and per-lane) can then be published (e.g., by the mapping platform 119) as real-time traffic information from drones 103 at that time epoch.

Returning to FIG. 1, as shown, the system 100 comprises a swarm 111 of aerial drones 103 equipped with a variety of sensors that are capable flying or operating over a road network. In one embodiment, the aerial drones 103 are capable of operating autonomously or via a remote pilot to fly the drone 103. The drone platform 117 can also configure a flight path or route for the drones 103 to provide traffic monitoring over road segments with markers 115. The drones 103 may include any number of sensors 101 including cameras, recording devices, communication devices, etc. By way example, the sensors 101 may also include, but are not limited to, a global positioning system (GPS) sensor for gathering location data based on signals from a satellite, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and/or the like. The drones 103 may also include recording devices for recording, storing, and/or streaming sensor and/or other telemetry data to the drone platform 117 and/or mapping platform 119.

In one embodiment, the drones 103 are also capable of being configured with and executing at least one traffic monitoring path (e.g., flight path or air route) based, at least in part, on navigating to the locations of markers 115 in the geographic area 105, and then adjusting its position based on image data or other sensor data of the markers 115. In one embodiment, the drones 103 may determine contextual information such as wind and weather conditions on route that may affect the drone 103's ability to follow the specified path or maintain its position over a marker 115 (e.g., using one or more onboard sensors) and then relay this information in substantially real-time to the drone platform 117 for route adjustment. In one embodiment, the drones 103 may request one or more modifications of the traffic monitoring path based, at least in part, on the determination of the contextual information or a change task priority (e.g., detection of a dynamic event).

In one embodiment, the drone platform 117 creates a data object to represent the delivery path, and may automatically modify the travel path data object based on receipt of the contextual information from the drones 103 or another source and then transmit the new travel path data object to the drones 103 for execution. In one embodiment, the drones 103 can determine or access the new travel path data object and/or determine or access just the relevant portions and adjust its path accordingly. For example, in windy conditions, the system 100 may bypass a marker 115 to better ensure that the drone 103 can potential obstructions (e.g., tree branches or structures) near the bypassed marker 115.

By way of example, the drones 103 may execute software applications, which may include various applications such as a traffic monitoring application, a computer vision application, a routing application, a location-based service application, a navigation application, a camera/imaging application, and/or the like. In one embodiment, the applications may include one or more feature recognition applications used for identifying or mapping markers 115 or other road features (e.g., vehicles, signs, lane lines, etc.) according to the embodiments described herein. In one embodiment, the application may act as a client for the drone platform 117 and perform one or more functions of the drone platform 117.

In one embodiment, the computer vision system 129 includes a neural network or other machine learning/parallel processing system to automatically detect features such as markers 115, lane lines, vehicles, and/or other objects in image data. In one embodiment, the neural network of the computer vision system 129 is a traditional convolutional neural network which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above.

In one embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the drones 103, drone platform 117, mapping platform 119, and services platform 125 communicate with each other and other components of the communication network 123 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
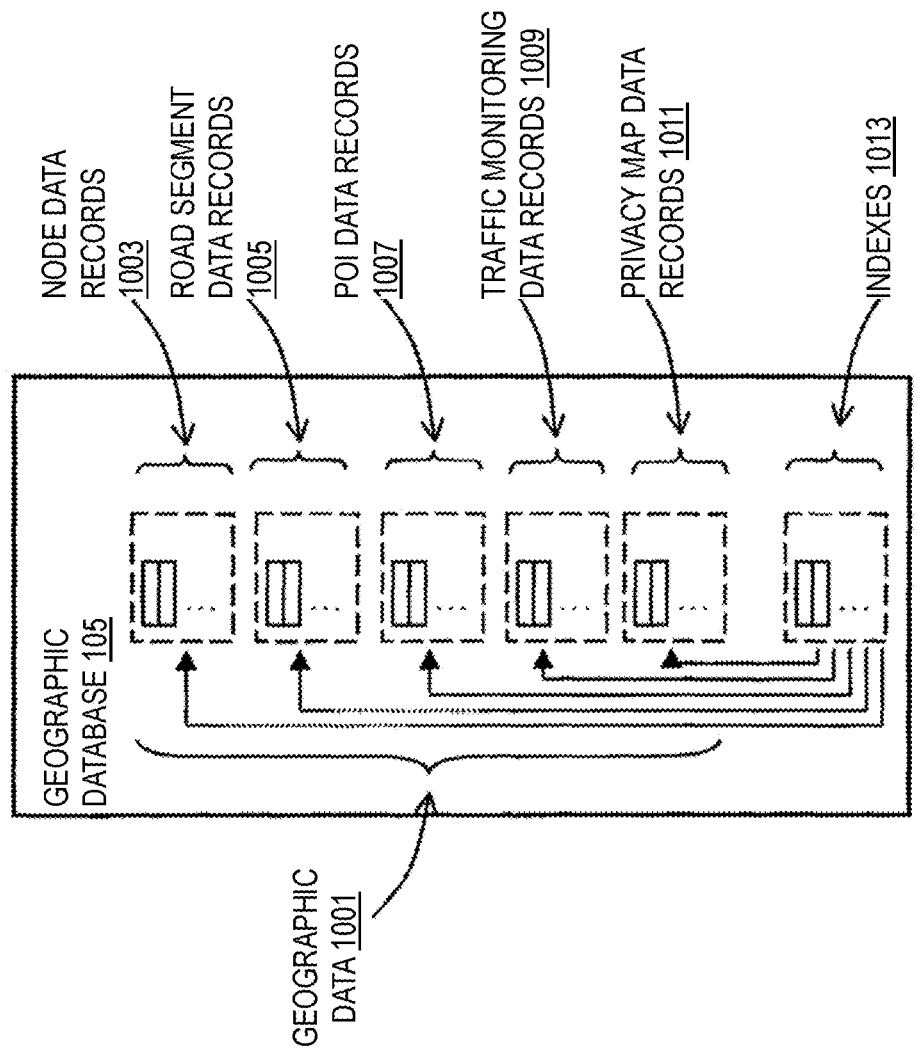
FIG. 10 is a diagram of a geographic database capable of storing map data of privacy-sensitive features, according to one embodiment.

FIG. 10 is a diagram of a geographic database, according to one embodiment. In one embodiment, the geographic database 133 includes geographic data 1001 used for (or configured to be compiled to be used for) mapping and/or navigation-related services, such as for routing drones to create a 3D flightpath or route. In one embodiment, the 3D flightpath or route is executed a drone 103 for traffic monitoring using markers 115. For example, the geographic database 1001 stores navigable air corridors as well as 3D model data (e.g., 3D object models of buildings/structures), among other related data.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 133.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 133 follows certain conventions. For example, links do not cross themselves and do not cross each other except at a node. Also, there are no duplicated shape points, nodes, or links. Two links that connect each other have a common node. In the geographic database 133, overlapping geographic features are represented by overlapping polygons. When polygons overlap, the boundary of one polygon crosses the boundary of the other polygon. In the geographic database 133, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 1001 of the database 133 includes node data records 1003, road segment or link data records 1005, POI data records 1007, model/indoor map data records 1009, traffic monitoring data records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 133. In one embodiment, the indexes 1013 may be used to quickly locate data without having to search every row in the geographic database 133 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. In addition, the geographic database 133 can contain path segment and node data records or other data that represent 3D paths around 3D map features (e.g., terrain features, buildings, other structures, etc.) that occur above street level, such as when routing or representing flightpaths of aerial vehicles (e.g., drones 103), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 133 can include data about the POIs and their respective locations in the POI data records 1007. The geographic database 133 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 133 can also traffic monitoring data records 1009 for storing traffic monitoring data (e.g., traffic volume, traffic speed, dynamic events, etc.) determined from drone-based monitoring according to the embodiments described herein. In one embodiment, the traffic monitoring data records 1009 can be associated with one or more of the node records 1003, road segment records 1005, and/or POI data records 1007 so that the traffic monitoring data can inherent characteristics, properties, metadata, etc. of the associated records (e.g., location, address, POI type, etc.).

As discussed previously, the system 100 is capable of generating traffic monitoring routes by considering locations of physical markers 115. In one embodiment, the resulting routing from various 3D locations to markers 115 of interest can be stored in a map layer corresponding to the traffic monitoring data records 1009. By way of example, once created, the traffic monitoring routes can be stored for later retrieval. In this way, previously generated routes can be reused for future traffic monitoring to the same target markers 115 or locations.

In one embodiment, the geographic database 133 can be maintained by the services platform 125 and/or any of the services 127 of the services platform 125 (e.g., a map developer). The map developer can collect geographic data to generate and enhance the geographic database 133. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles (e.g., mapping drones or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 133 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the drone 103. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for using drones for road and traffic monitoring may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
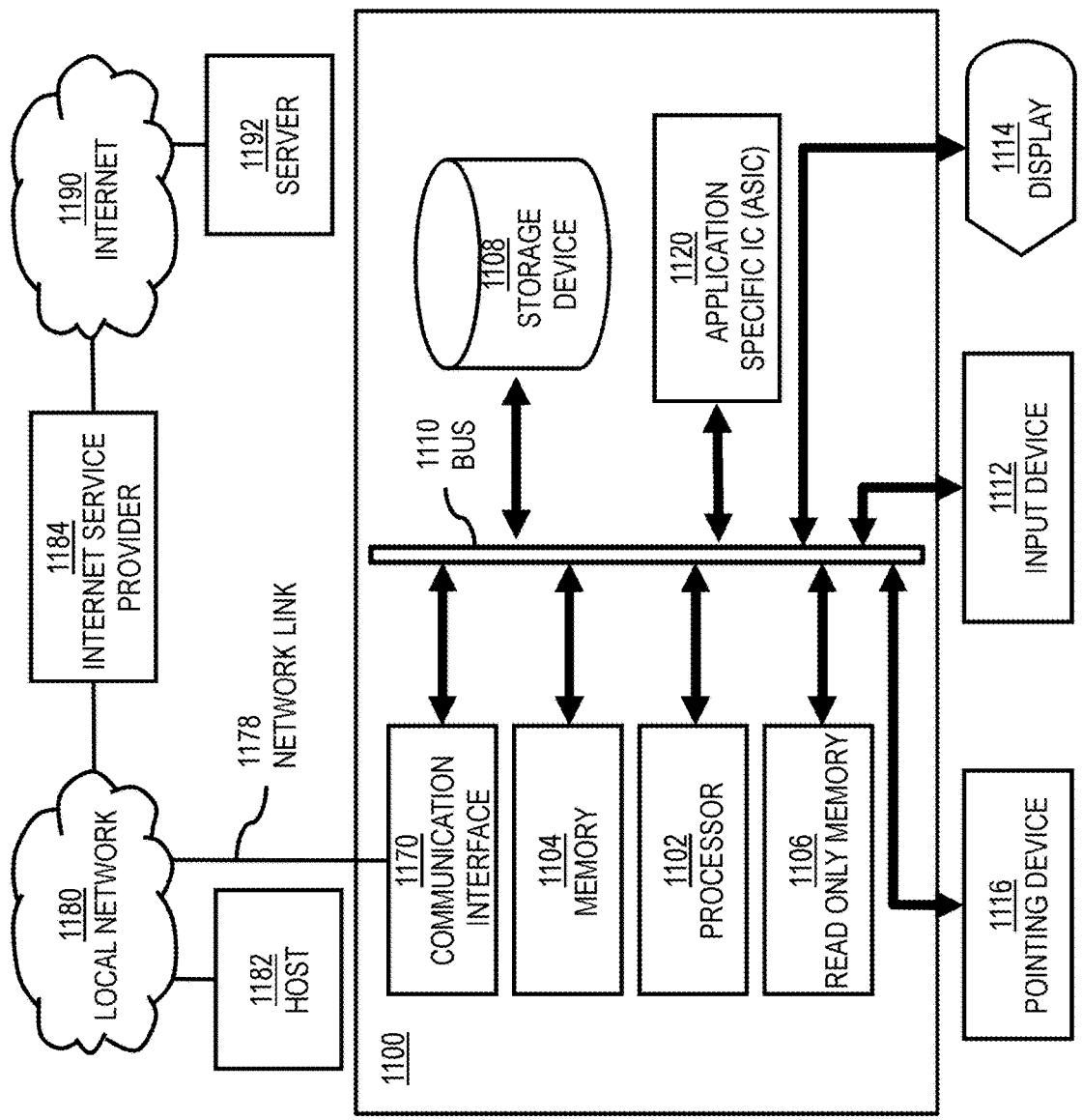
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to use drones for road and traffic monitoring as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to using drones for road and traffic monitoring. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for using drones for road and traffic monitoring. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for using drones for road and traffic monitoring, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 123 for using drones for road and traffic monitoring.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to use drones for road and traffic monitoring as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to use drones for road and traffic monitoring. The memory 1205 also stores the data associated with or generated by the execution of the inventive steps.

Figure 13:
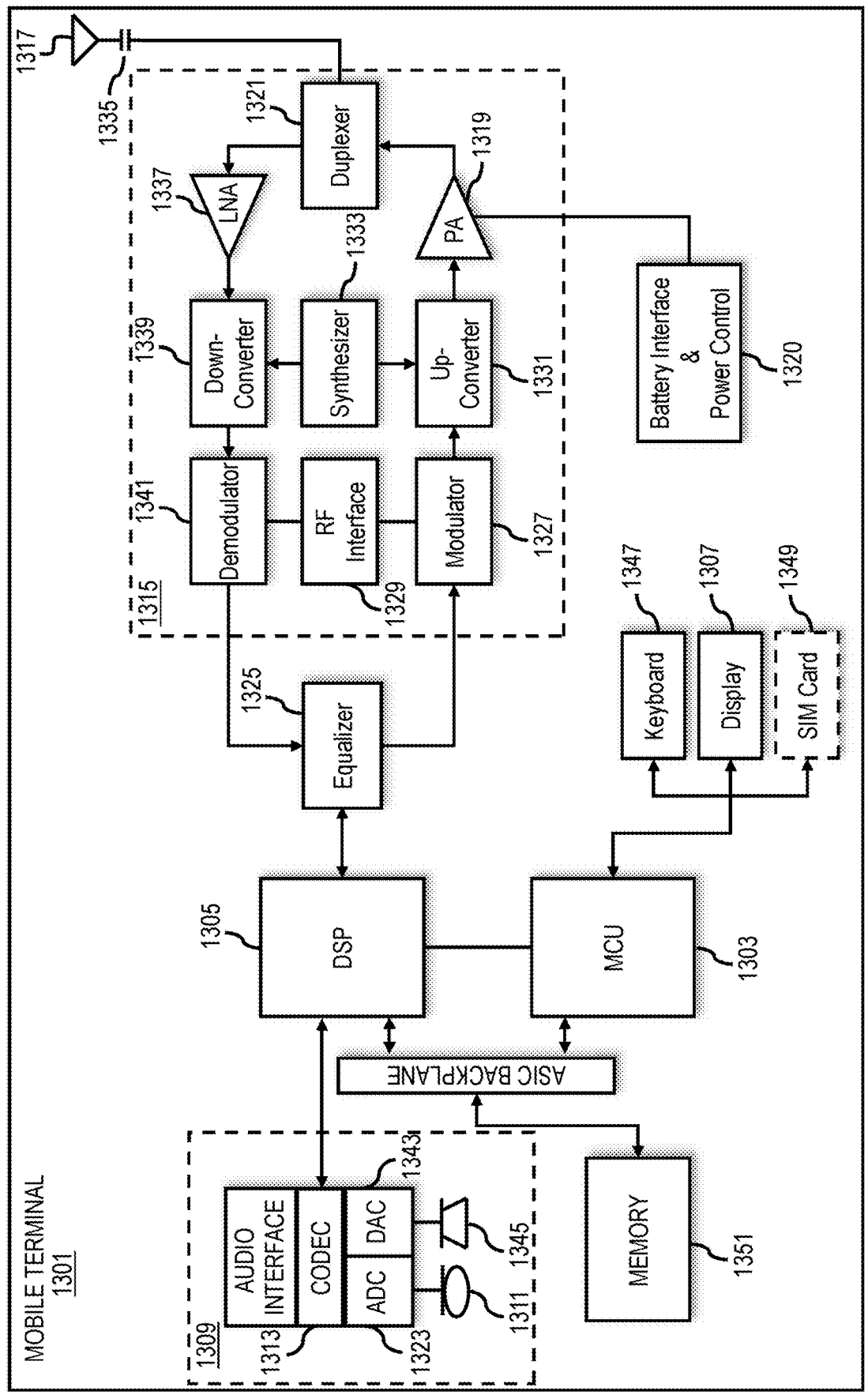
FIG. 13 is a diagram of a mobile terminal (e.g., handset) that can be used to implement an embodiment.

FIG. 13 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to use drones for road and traffic monitoring. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   navigating an aerial drone to a coded physical marker affixed to a road link, wherein the coded physical marker includes road link information including at least road link location and road link type;

initiating a capture of sensor data of the coded physical marker by a sensor of the aerial drone;

adjusting a position, an altitude, or a combination thereof of the aerial drone to a reference position, a reference altitude, or a combination thereof over the coded physical marker based on the sensor data;

initiating a capture of one or more images of the road link by the aerial drone at the reference position, the reference altitude, or a combination thereof; and processing the one or more images of the road link captured at the reference position, the reference altitude, or a combination thereof to determine one or more dynamic events.

2. The method of claim 1, wherein the coded physical marker is affixed to the road link and the sensor data of the coded physical marker is an image of the coded physical marker.

3. The method of claim 2, wherein the adjusting of the position of the aerial drone to the reference position over the coded physical marker comprises moving the aerial drone until the coded physical marker is positioned at a target location in a field of view of the image of the coded physical marker.

4. The method of claim 3, wherein the target location is a center of the field of view.

5. The method of claim 3, wherein the adjusting of the altitude of the aerial drone to a reference altitude over the coded physical marker comprises moving the aerial drone until the coded physical marker appears at a target size in the image.

6. The method of claim 1, wherein the one or more images are processed to further determine a traffic volume, a traffic speed, or a combination thereof on the road link.

7. The method of claim 6, wherein the traffic volume, the traffic speed, the one or more dynamic events are determined with respect to a location of the coded physical marker in the one or more images.

8. The method of claim 6, further comprising:
determining a plurality of lanes of the road link based on the processed one or more images of the road link,
wherein the traffic volume, the traffic speed, the one or more dynamic events, or a combination thereof are determined at a lane-specific level with respect to the road link according to the determined plurality of lanes.

9. The method of claim 1, wherein the coded physical marker has a predetermined size, encodes one or more attributes of the coded physical marker, or a combination thereof, and wherein the one or more attributes include a marker identifier, the reference position, the reference altitude, or a combination thereof.

10. The method of claim 1, wherein the aerial drone is part of a swarm of drones docked throughout a geographic area that includes the road link.

11. An apparatus comprising:
at least one processor; and
at least one memory including computer program code for one or more programs, the at least one memory and the computer program code configured to, with the at least one processor, cause the apparatus to perform at least the following:
navigate an aerial drone to a coded physical marker affixed to a road link, wherein the coded physical marker includes road link information including at least road link location and road link type;
initiate a capture of sensor data of the coded physical marker by a sensor of the aerial drone;

adjust a position, an altitude, or a combination thereof of the aerial drone to a reference position, a reference altitude, or a combination thereof over the coded physical marker based on the sensor data;

initiate a capture of one or more images of the road link by the aerial drone at the reference position, the reference altitude, or a combination thereof; and process the one or more images of the road link captured at the reference position, the reference altitude, or a combination thereof to determine one or more dynamic events.

12. The apparatus of claim 11, wherein the coded physical marker is affixed to the road link, wherein the sensor data of the coded physical marker is an image of the coded physical marker, and wherein the adjusting of the position of the aerial drone to the reference position over the coded physical marker comprises moving the aerial drone until the coded physical marker is positioned at a target location in a field of view of the image of the coded physical marker.

13. The apparatus of claim 11, wherein the sensor data of the coded physical marker is an image of the coded physical marker, and wherein the adjusting of the altitude of the aerial drone to a reference altitude over the coded physical marker comprises moving the aerial drone until the coded physical marker appears at a target size in the image.

14. The apparatus of claim 11, wherein the apparatus is further caused to:
determine a plurality of lanes of the road link based on the processed one or more images of the road link, wherein the one or more images are processed to further determine a traffic volume, a traffic speed, or a combination thereof on the road link,
wherein the traffic volume, the traffic speed, the one or more dynamic events, or a combination thereof are determined at a lane-specific level with respect to the road link according to the determined plurality of lanes.

15. The apparatus of claim 11, wherein the coded physical marker has a predetermined size, encodes one or more attributes of the coded physical marker, or a combination thereof, and wherein the one or more attributes include a marker identifier, the reference position, the reference altitude, or a combination thereof.

16. A system comprising:
a swarm of aerial drones;
a plurality of docking stations configured to dock the swarm of drones; and
at least one coded physical marker affixed to at least one road link, wherein the coded physical marker includes road link information including at least road link location and road link type,
wherein at least one aerial drone of the swarm of aerial drones is configured to:
navigate to the at least one coded physical marker;
initiate a capture of sensor data of the at least one coded physical marker by a sensor of the at least one aerial drone;
adjust a position, an altitude, or a combination thereof of the at least one aerial drone to a reference position, a reference altitude, or a combination thereof over the at least one coded physical marker based on the sensor data;
initiate a capture of one or more images of the road link by the aerial drone at the reference position, the reference altitude, or a combination thereof; and process the one or more images of the road link captured at the reference position, the reference altitude, or a combination thereof to determine one or more dynamic events.

17. The system of claim 16, wherein the sensor data of the at least one coded physical marker is an image of the at least one physical marker, and wherein the adjusting of the position of the at least one aerial drone to the reference position over the at least one coded physical marker comprises moving the at least one aerial drone until the at least one coded physical marker is positioned at a target location in a field of view of the image of the at least one coded physical marker.

18. The system of claim 16, wherein the sensor data of the at least one coded physical marker is an image of the at least one coded physical marker, and wherein the adjusting of the altitude of the at least one aerial drone to a reference altitude over the at least one coded physical marker comprises moving the at least one aerial drone until the at least one coded physical marker appears at a target size in the image.

19. The system of claim 16, wherein the at least one aerial drone is further configured to:

determine a plurality of lanes of the road link based on the processed one or more images of the road link, wherein the one or more images are processed to further determine a traffic volume, a traffic speed, or a combination thereof on the road link, wherein the traffic volume, the traffic speed, the one or more dynamic events, or a combination thereof are determined at a lane-specific level with respect to the road link according to the determined plurality of lanes.

20. The system of claim 16, wherein the at least one coded physical marker has a predetermined size, encodes one or more attributes of the at least one coded physical marker, or a combination thereof, and wherein the one or more attributes include a marker identifier, the reference position, the reference altitude, or a combination thereof.

* * * * *